US005408732A

United States Patent [19]

Anfuso

[11] Patent Number: 5,408,732

[45] Date of Patent: Apr. 25, 1995

[54] WHEEL HUB PULLER PARTICULARLY SUITED FOR HEAVY DUTY TRUCKS, BUSES AND TRAILERS

[75] Inventor: Frank P. Anfuso, Bethlehem, Pa.

[73] Assignee: William D. Leseberg, Emmaus, Pa.

[21] Appl. No.: 198,967

[22] Filed: Feb. 18, 1994

[51] Int. Cl.[6] .............................................. B23P 19/04

[52] U.S. Cl. ......................................... 29/263; 29/265

[58] Field of Search ................................. 29/263–265, 29/261

[56] References Cited

U.S. PATENT DOCUMENTS 3,055,093 9/1962 Ruble .................................... 29/265
3,327,377 6/1967 German .................................. 29/263
3,986,383 10/1976 Petteys .................................. 29/263
4,009,515 3/1977 Racin ..................................... 29/265

*Primary Examiner*—Robert C. Watson
*Attorney, Agent, or Firm*—Sanford J. Piltch

[57] ABSTRACT

Apparatus particularly suited for pulling a hub assembly that is seized to an axle of a heavy duty truck, bus or trailer. The axle has a hollow into which is inserted an expandable/contractible assembly of the apparatus. The apparatus also has a collar assembly that is attached to the hub assembly that is to be removed. The apparatus, by rotation of its handle, easily removes and frees the hub assembly from the axle.

8 Claims, 4 Drawing Sheets

WHEEL HUB PULLER PARTICULARLY SUITED FOR HEAVY DUTY TRUCKS, BUSES AND TRAILERS

FIELD OF THE INVENTION

This invention relates to a multi-purpose tool for pulling a hub and, more particularly, to a puller that is insertable into the hollow of an axle housing of a heavy-duty truck so as to remove a hub assembly (tire and wheel) that is seized on the axle of the truck.

BACKGROUND OF THE INVENTION

The present invention seeks to resolve the problems of easily and conveniently removing a hub, carrying a wheel and a tire, that is seized onto an axle, especially, the axle of a heavy-duty truck. A hub that carries a wheel and a tire is commonly referred to as a wheel hub, or simply the hub assembly. After several thousand miles of travel on various types of roads and highways and under various weather conditions, wheel hubs, and especially those mounted on large trucks, may tend to become seized onto the axle on which the hubs are mounted. This seizure may be caused by road oil, dirt, water and other collected debris which may form a bond around the interface of the wheel hub and the axle. Over a period of time this collection of material creates an adhesive bond which is quite strong and results in great difficulty during the removal of wheel hub from the axle when, for example, a flat tire occurs. A wheel hub may also be difficult to remove because burnt bearing sometimes weld or seize themselves to the axle housing, especially those axles found on heavy duty trucks, buses and trailers. It is reported that the generally used approach by truck drivers and mechanics in breaking the bond of the wheel hub to the axle is to use a sledge hammer that is struck a multiple number of times against the wheel hub until the bond is broken. Such an approach, however, is possible destructive.

Another approach is described in U.S. Pat. No. 4,908,925 to R. E. Johnson. This patent discloses a relatively complicated arrangement comprising multiple pieces that are mounted directly to the wheel hub and serves to free the seized wheel hub from the axle. It is desired that a less complicated wheel hub puller, such as a separable yet one-piece device, be provided to free a seized wheel hub from an axle, especially a hollow axle such as those found on heavy duty trucks, buses and trailers.

It is, therefore, a principal object of the present invention to provide a wheel hub puller that is particularly suited for use with heavy trucks, buses and trailers having a hollow axle.

It is another object of the present invention to provide a wheel hub puller which is simple, easily operated and so constructed that it may be employed by a relatively unskilled workman to free a seized wheel hub from an axle.

It is also an object of the present invention to provide a wheel hub puller having a handle that may be used by an operator to facilitate the easy and convenient removal of a wheel hub that is seized onto an axle.

It is a further object of the present invention to provide a wheel hub puller that is dimensioned to accommodate differently sized wheel hubs.

Further objects will become evident hereinafter.

SUMMARY OF THE INVENTION

The apparatus of the present invention relates generally to wheel hub pullers. Specifically, this invention relates to a wheel hub puller apparatus that is particularly suited for use on heavy vehicles that have a hollow axle.

The wheel hub puller apparatus has an expandable/-contractible assembly and a collar. The expandable/-contractible assembly is adapted to be inserted into the hollow of the axle, whereas the collar is adapted to be connected onto lugs of the axle. The wheel hub puller apparatus has a rod which is adjusted to clamp the expandable/contractible assembly in place within the hollow and a threaded tubular member which is easily adjustable by a handle and whose rotation moves the collar outwardly carrying with it the wheel hub that may be seized to the axle. The rod has first and second ends with a grippable head at the first end and the expandable/contractible assembly connected at the second end. The expandable/contractible assembly has means so as to be radially expandable/contractible in response to rotation of the rod. The threaded tubular member has a hollow that is placed over the rod and has a first end that is in correspondence with the first end of the rod. The collar has a threaded opening which threadably engages the threaded tubular member and has at least one arm to which is attached a dog member having an elongated opening.

BRIEF DESCRIPTION OF THE DRAWINGS

For the purpose of illustrating the invention, there are shown in the drawings embodiments which are presently preferred; however, it should be understood, that the invention is not limited to the precise arrangements and instrumentalities shown.

DETAILED DESCRIPTION OF THE PREFERRED EMBODIMENTS

The following detailed description is the best presently contemplated mode of carrying out the present invention. This description is not intended in any limiting sense, but rather is made solely for the purpose of illustrating the general principles of the invention.

Figure 1:
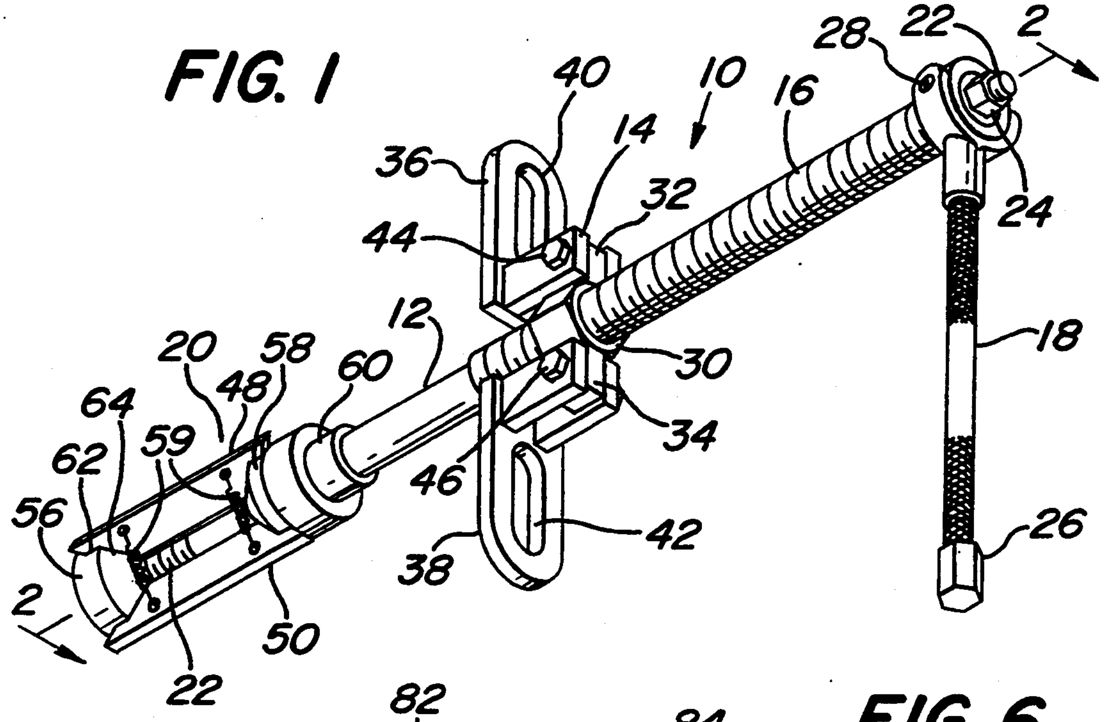
FIG. 1 is an isometric view of the wheel hub puller apparatus of the present invention.

Referring now to the drawings in detail, wherein like numerals indicate like elements, there is shown in FIG. 1 a wheel hub puller apparatus 10 of the present invention. As used herein, the term wheel hub is meant to represent the hub assembly of a vehicle, such as a heavy duty truck, bus or trailer, that carries with it one or more wheels each of which in turn carry a tire. The wheel hub puller apparatus 10 comprises a rod 12, a collar assembly 14, a threaded tubular member 16, preferably a handle 18 connected to the first end of the tubular member 16, and a radially expandable/contractible assembly 20 attached to one end of the rod 12.

In general, the wheel hub puller apparatus 10 operates by having its expandable/contractible assembly 20 fixed or clamped in position within a hollow axle of a heavy-duty truck, bus or trailer. The expandable/contractible assembly 20 moves radially outward in response to the rotation of rod 12. The collar assembly 14 is attached or clamped to one or more lugs of a housing for the axle. With both components (14 and 20) clamped in position, the handle 18 is rotated and a collar 14 is urged outward carrying with it the wheel hub that may have been seized to the axle.

The rod 12 has an extension member 22 having threads on one of its ends that cooperates with the expandable/contractible assembly 20 and a hex head gripping member 24 that is used to create rotation of extension member 22. Threaded tubular member 16 has a hollow that is placed over the rod 12 and has its first end located proximate the gripping head 24 and to which end is attached a handle 18 having a gripping head 26 of a hex arrangement. The handle 18 is preferably attached to the threaded tubular member 16 by means of at least one pin 28.

The collar assembly 14 has a hex member 30 with an internally threaded opening that threadably engages the threaded tubular member 16. The member 30 has oppositely extending arms 32 and 34 attached thereto to which in turn are respectively attached to holding or dog members 36 and 38. The dog members 36 and 38, respectively, have elongated openings 40 and 42 and which openings are respectively attached to arms 32 and 34 by means of fasteners 44 and 46.

The radially expandable/contractible assembly 20 is attached to the second end of rod 12 and has a plurality of radially expandable/contractible plates 48, 50 and 52. The plates 48, 50 and 52, shown in FIG. 1, are held together by retaining and yielding means 54, preferably formed of a spring, and move in unison in response to the relative movement of first and second chuck members 56 and 58. Each of the chuck members 56 and 58 has slots (not shown) which cooperate to receive the outer, angled sides of the plates 48, 50 and 52. The slots of chuck members 56 and 58 are spaced equidistantly about their respective periphery and in which each of the plates 48, 50 and 52 ride as the chucks 56 and 58 are moved toward and away from one another in a manner to be described hereinafter. The chuck member 58 is coupled to the rod 12 by coupling member 60. The radially expandable/contractible plates 48, 50 and 52 each, at their end region, have surfaces 62 and 64 that are contoured to conform to the ledge and tapered sections of the chuck members 56 and 58 as shown in FIG. 1. The radially expandable/contractible plates 48, 50 and 52 may be further described with reference to FIG. 2, which is a view taken along line 2—2 of FIG. 1.

Figures 2, 3:
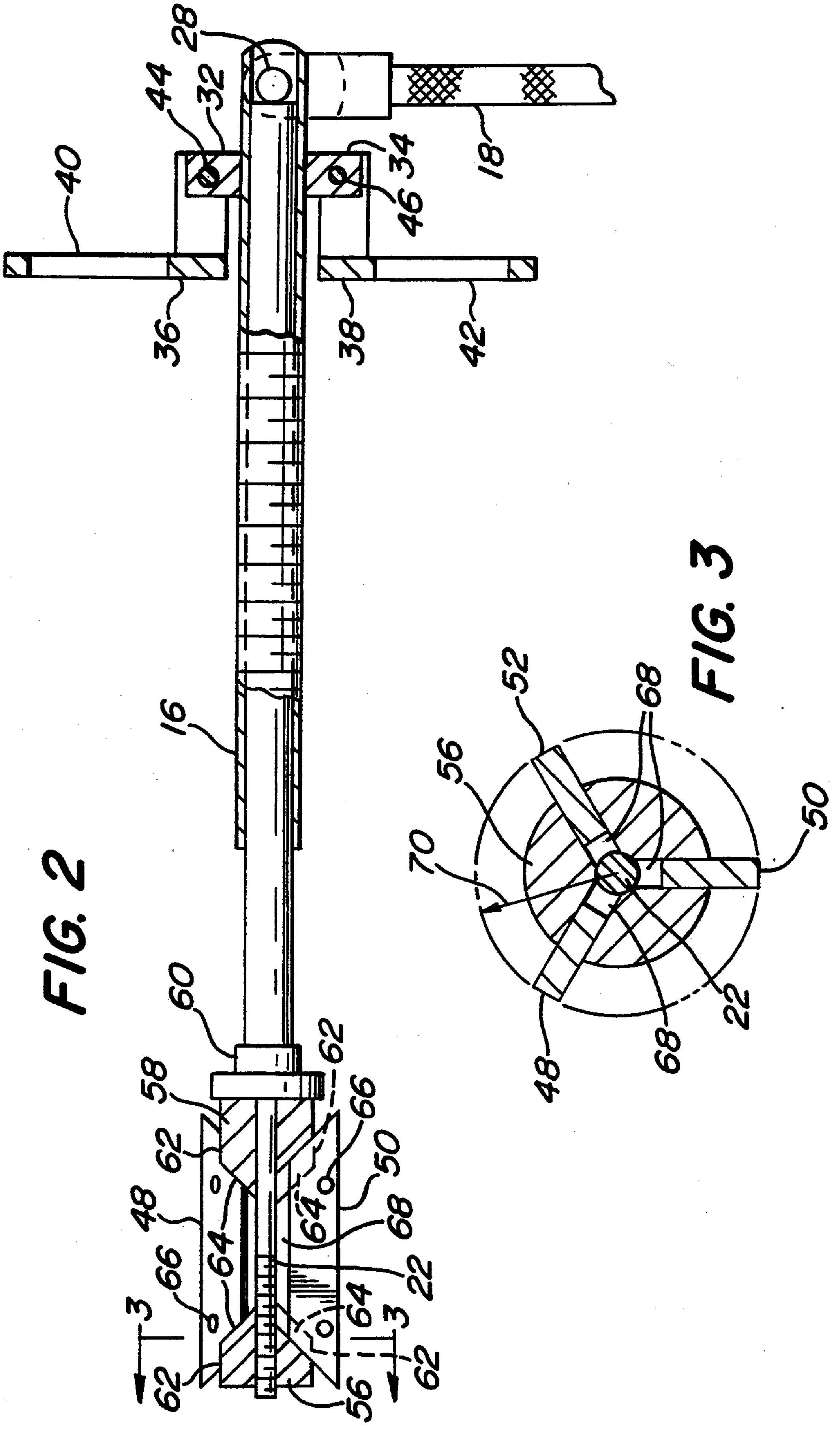
FIG. 2 is a cross-sectional view of the wheel hub puller apparatus, taken along line 2—2 of FIG. 1.
FIG. 3 is a cross-sectional view of a portion of the wheel hub puller apparatus, taken along line 3—3 of FIG. 2.

FIG. 2 shows the radially expandable/contractible plates 48, 50 and 52 (not shown) as being devoid of the yieldable means 54 so as to illustrate the mounting holes 66 through which the yieldable means 54 pass through. The yieldable means 54 comprises a spring having a sufficient force to return the plates 48, 50 and 52 to their rest position when the chuck members 56 and 58 are moved away from each other in a manner as to be described hereinafter. The radially expandable/contractible plates 48, 50 and 52 are separated from the extension member 22 by a gap 68. The radially expandable/contractible plates 48, 50 and 52 may further be described with reference to FIG. 3, which is a view taken along line 3—3 of FIG. 2.

FIG. 3 illustrates each of the radially expandable/-contractible plates 48, 50 and 52 as having a related radius 70 that encompasses the gap 68. The radius 70 is relative to the center of the extension member 22 that is threadably engaged to the chuck member 56. The operation of the radially expandable/contractible plates 48, 50 and 52 may be further described with reference to both FIGS. 4 and 5, in which FIG. 5 is a view taken along line 5—5 of FIG. 4.

Figure 4:
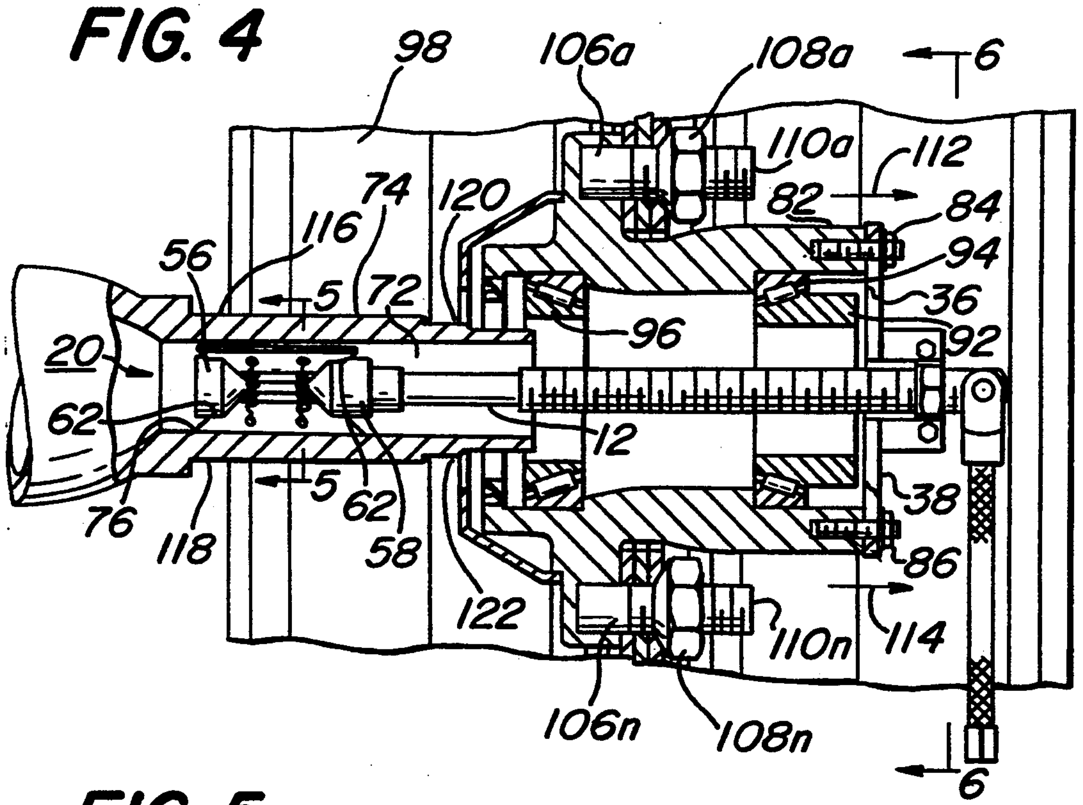
FIG. 4 is a fragmentary view of the wheel hub puller apparatus inserted into the hollow of an axle housing with the wheel hub puller being shown as partially pulled away from the axle housing.

With regard to FIG. 4, the radially expandable/contractible assembly 20 is shown in its almost fully radially expandable condition so that its plates 48, 50 and 52 are each contacting and frictionally engaging the inner walls of the hollow 72 of the axle housing 74 of a heavy duty truck, bus or trailer. The axle housing 74 is sometimes referred to as merely the axle and such reference may be used herein.

Figure 5:
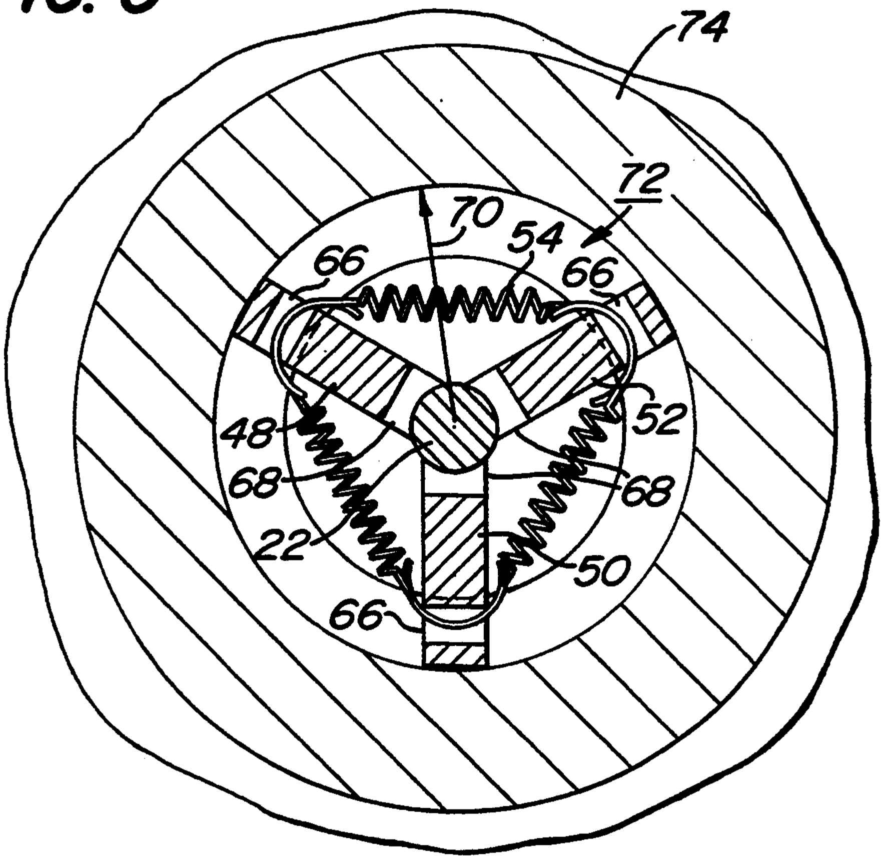
FIG. 5 is a cross-sectional view of the wheel hub puller apparatus, taken along line 5—5 of FIG. 4, showing the radially expandable plates of the expandable/-contractible assembly.

With regard to FIG. 5, the radially expandable/contractible assembly 20 is shown in its almost fully radially expanded condition so that each of its plates 48, 50 and 52 is firmly engaging the inner walls of the hollow 72 of the axle housing 74. To establish the radial engagement of plates 48, 50 and 52, the rod 12 is merely rotated in a certain direction (for example, clockwise) by means of engaging head 24 (see FIG. 1) so that the chuck member 56 moves toward the chuck member 58. As the chuck member 56 moves toward chuck member 58, each of the plates 48, 50 and 52 smoothly, but firmly, ride on the chuck members 56 and 58 overcoming the spring force of the yieldable means 54 so as to eventually have their contoured portion 62 ride on and span over a portion of the ledge of the chuck members 56 and 58. At this time, each of the plates 48, 50 and 52 are firmly engaged with the inner walls of the hollow 72 so as to establish a fixed location, such as that indicated by reference number 76, for the expandable/contractible assembly 20. The plates 48, 50 and 52 frictionally engage the walls of the hollow 72 and are not dragged along the walls as the hub assembly is freed from the axle in a manner as to be described hereinafter.

The disengagement of plates 48, 50 and 52 from the inner walls of the hollow 72 is accomplished in a similar, yet opposite manner as their engagement. More particularly, the rod 12 is now rotated in its opposite direction (for example, counterclockwise) so that the chuck member 56 moves away from chuck member 58 until the portion 62 of each of the plates 48, 50 and 52 is no longer carried by the ledge portion of the chuck members 56 and 58. At this time, and as more clearly appreciated with reference to FIG. 5, the spring action of the yieldable means 54 pulls the plates 48, 50 and 52 toward the extension member 22 until there is no longer any gap 68. In this collapsed condition, the radially expandable/contractible assembly 20 no longer frictionally engages the hollow 72 and it may now be moved anywhere within the hollow 72 to establish another fixed or clamped location 76 or it may even be removed from the hollow 72 altogether. A second fixed location, related to the operation of the present invention, is established by the collar assembly 14 and which may be further described with reference FIG. 6, which is a view taken along lines 6—6 of FIG. 4.

Figure 6:
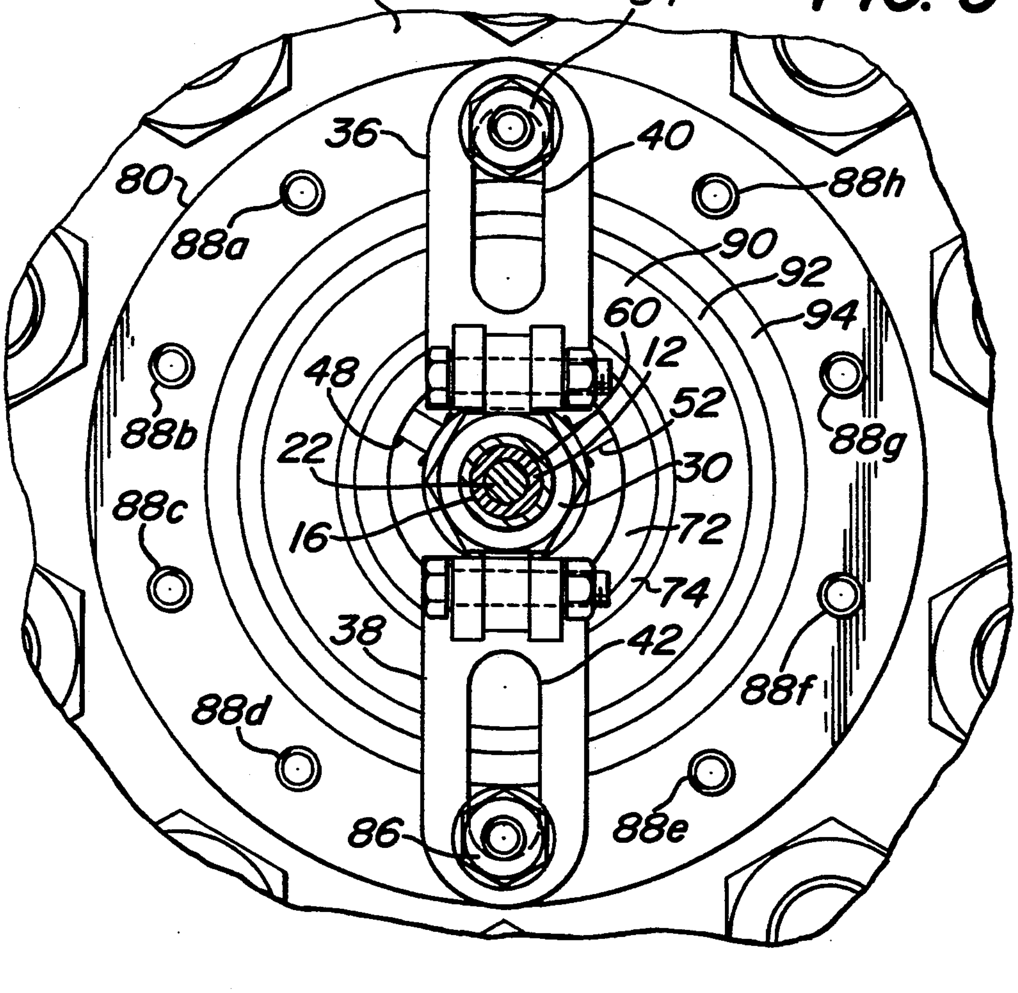
FIG. 6 is a cross-sectional view of the wheel hub puller apparatus, taken along line 6—6 of FIG. 4, showing the connection of the dog members of the wheel hub puller apparatus to the axle housing.

FIG. 6 illustrates the face 80 of the axle housing 74 flush with the hub assembly having axle studs 84 and 86, but devoid of any remaining studs so as to expose the plurality of the threaded opening 88*a*, 88*b*, 88*c*, 88*d*, 88*e*, 88*f*, 88*g* and 88*h* of hub assembly 82. FIG. 6 further illustrates that the axle studs 84 and 86 respectively are flush mounted onto dog members 36 and 38. Further, from FIG. 6 it can be seen that the elongated openings 40 and 42 serve as the provisions to accommodate different diameters of the hub assembly 82. FIG. 6 also shows that the threads of the opening of collar 30 threadably engage the tubular member 16. The opening of collar 30 encircles the rod 12, as well as the extension member 22 and the tubular member 16. Once the dog members 36 and 38 are flush mounted and attached to the hub assembly 82, the collar assembly 14 is rigidly fixed or clamped in position ready to contribute to the removal the hub assembly 82 from the axle housing 74. The axle housing 74 is shown as being proximate to annular member 90 and also proximate to the portions 92 and 94 of an outer bearing. The removal of the wheel hub 82 that may be seized onto the axle housing 74 of the heavy duty truck may be further described with reference to FIG. 7.

Figure 7:
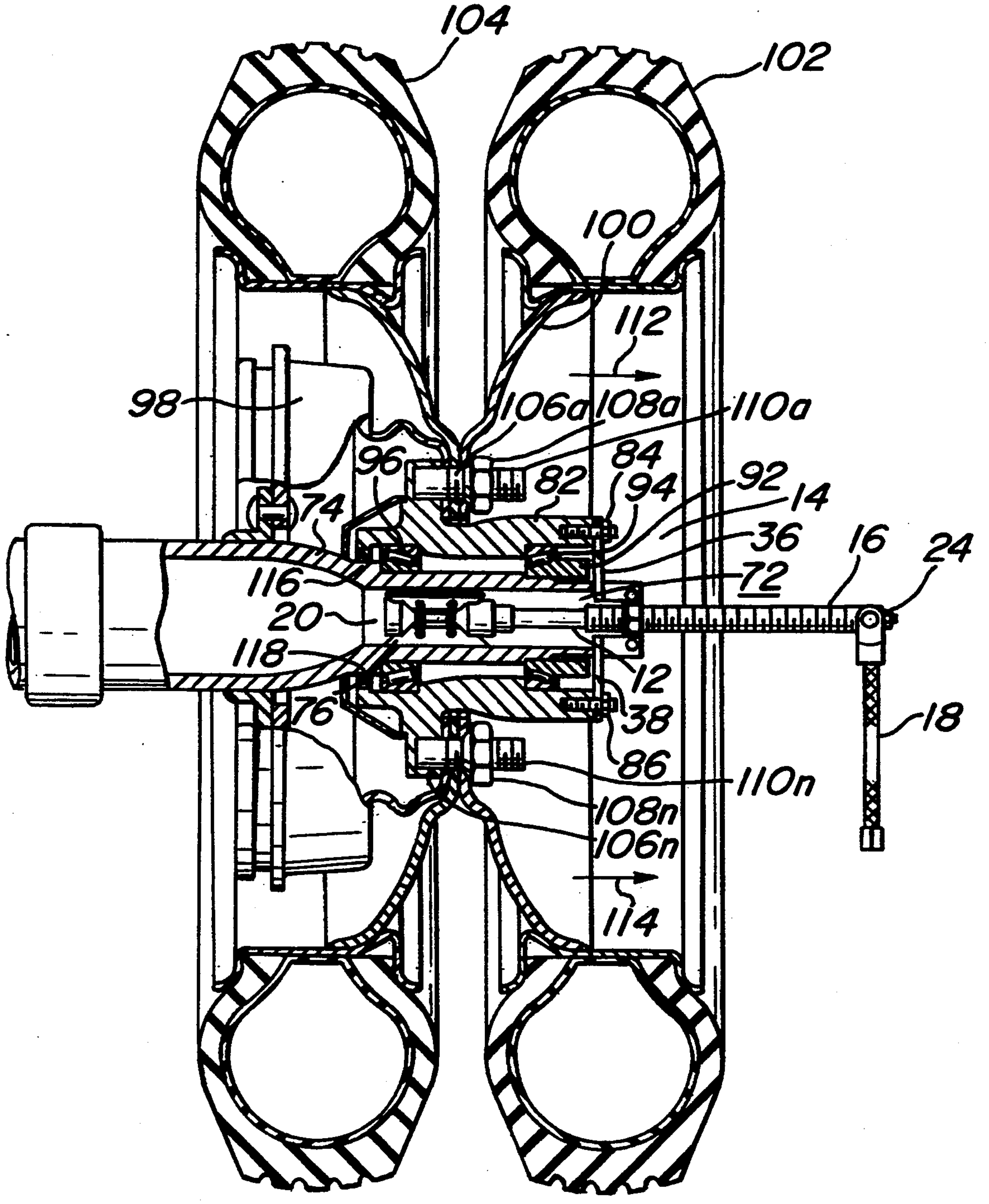
FIG. 7 is a general cross-sectional view of the wheel hub of a truck carrying wheels and tires and with the wheel hub and wheel puller apparatus in position for freeing the wheel hub from the axle housing.

FIG. 7 illustrates other components of the heavy duty truck, such as an inner or second bearing 96 located in close proximity to brake drum 98. Further, FIG. 7 illustrates a dual wheel 100 having mounted thereon two separate tires 102 and 104. The dual wheel 100 is connected to the hub assembly 82 by means of a series of wheel studs 106*a*–106*n*, wheel nuts 108*a*–108*n* and wheel lugs 110*a*–110*n* lying around the circumference of the hub assembly 82.

FIG. 7 is similar to FIG. 5 but illustrates the radially expandable/contractible assembly 20 located in the hollow 72 of the axle housing 74. However, FIG. 7 illustrates the expandable/contractible assembly 20 as not fully engaging the inner walls of the hollow 72. More particularly, the expandable/contractible assembly 20 is shown in its at-rest position. However, as previously described, to cause the plates 48, 50 and 52 of the assembly 20 to engage the walls of the hollow 72, the hex head 24 of rod 12 need only be turned in a particular direction so that chucks 56 and 58 move toward each other which, in turn, cause the plates 48, 50 and 52 to expand radially and engage or clamp to the inner walls of the hollow 72.

Typically, after the assembly 20 is clamped in place, the threaded tube 16 is placed over the rod 12 and the dog member 36 and 38 are attached to the hub assembly 82. More particularly, and as previously described, the hollow of tube 16 is placed over the rod 12 so that there is no rotational interaction therebetween. Also as previously described, the tubular member 16 is threadedly engaged with the hex member 30 which, in turn, is fixed to the collar assembly 14 now attached to hub assembly 82. The handle 18 now need only be rotated in a particular direction, such as clockwise, and the hub assembly 82 will start to be moved in the directions of arrows 112 and 114 so that its innermost region, generally indicated by reference numbers 116 and 118, begins to move outward. The handle 18 is continued in its rotation so that the hub assembly 82 correspondingly continues to move outward until it is in an almost free position indicated in FIG. 4.

FIG. 4 illustrates that the hub assembly 82 has moved outward from regions 116 and 118 on the axle housing 74 to the regions 120 and 122 of the axle housing 74. Furthermore, FIG. 4 illustrates that the radially expandable/contractible assembly 20 has remained clamped at location 76. The hub assembly 82, now positioned at locations 120 and 122, may be physically or mechanically lifted away from the axle housing 74. Upon such lifting, the radially expandable/contractible assembly 20 remains in place and the tubular member 16 merely slips over rod 12 as it is being moved with the hub assembly 82.

It should now be appreciated that the practice of the present invention provides for a wheel hub puller apparatus that easily removes a hub assembly that is seized onto the axle of a vehicle, such as a heavy duty truck, bus or trailer. Also it should be appreciated that the wheel hub puller apparatus 10 is easily and conveniently operated.

The present invention may be embodied in other specific forms without departing from the essential attributes thereof and, accordingly, reference should be made to the appended claims rather than to the specification as an indication of the scope of the invention.

I claim:

1. A wheel hub puller apparatus for pulling a hub assembly off of an axle having a hollow comprising;
- a rod having first and second ends, said first end having a grippable head attached thereto;
- a radially expandable/contractible assembly attached to the second end of said rod and having means so as to be radially expandable/collapsible in response to the rotation of said rod;
- a threaded tubular member having a hollow that is placed and slips over said rod, said tubular member having a first end that is located proximate to said first end of said rod;
- a handle connected to said first end of said tubular member; and
- a collar having a threaded opening which threadably engages said threaded tubular member, said collar having at least one arm to which is attached a dog member having an elongated opening.

2. A wheel hub puller apparatus according to claim 1, wherein said rod further comprises an extension member to which said grippable head is attached.

3. A wheel hub puller apparatus according to claim 1, wherein said elongated opening of said dog is dimensioned so as to accommodate different sized hub assemblies.

4. A wheel hub puller apparatus according to claim 1, wherein said handle is attached to said tubular member by at least one pin.

5. A wheel hub puller apparatus for pulling a hub assembly off of an axle having a hollow, said wheel hub puller apparatus comprising;
- a rod having first and second ends, said first end having a grippable head attached thereto;
- a radially expandable/contractible apparatus comprising;
  - first and second chuck members oppositely disposed on said assembly and one of which is movable toward and away from the other in response to the rotation of said grippable head; and a plurality of plates connected to each other by yieldable means having a spring force so that said plates are biased radially inward and each of said plates having pre-shaped opposite ends contacting said respective ends of said first and second chuck members, said pre-shaped plates being moveable radially outward so as to overcome the spring force of said yieldable means in response to movement of said first and second chuck members toward one another;

a threaded tubular member having a hollow that is placed and slips over said rod, said tubular member having a first end that is located proximate to said first end of said rod;

a handle connected to said first end of said tubular member; and a collar having a threaded opening that threadably engages said threaded tubular member, said collar having at least one arm to which is attached a dog member having at least one elongated opening.

6. A wheel hub puller apparatus according to claim 5, wherein said rod further comprises an extension member that is connected to said grippable head.

7. A wheel hub puller apparatus according to claim 5, wherein said collar has two dog members oppositely disposed from each other and each having an elongated opening.

8. A wheel hub puller according to claim 7, wherein each of said elongated openings is dimensioned to accommodate different hub assemblies.

* * * * *